United States Patent
Genty et al.

(12)

(10) Patent No.: US 6,675,225 B1
(45) Date of Patent: Jan. 6, 2004

(54) METHOD AND SYSTEM FOR ALGORITHM-BASED ADDRESS-EVADING NETWORK SNOOP AVOIDER

(75) Inventors: Denise Marie Genty, Austin, TX (US); Gerald Francis McBrearty, Austin, TX (US); Shawn Patrick Mullen, Buda, TX (US); Johnny Meng-Han Shieh, Austin, TX (US); Ramachandran Unnikrishnan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/383,740

(22) Filed: Aug. 26, 1999

(51) Int. Cl.[7] .......................... G06F 15/173; G06F 15/16
(52) U.S. Cl. ....................................... 709/245; 709/239
(58) Field of Search ................................ 709/221, 225, 709/227, 239, 245

(56) References Cited

U.S. PATENT DOCUMENTS

| 6,078,586 | A | | 6/2000 | Dugan et al. ................ 370/395 |
| 6,092,200 | A | * | 7/2000 | Muniyappa et al. ........ 713/201 |
| 6,154,839 | A | * | 11/2000 | Arrow et al. ................ 713/154 |
| 6,173,399 | B1 | * | 1/2001 | Gilbrech ...................... 713/153 |
| 6,178,505 | B1 | * | 1/2001 | Schneider et al. .......... 713/168 |
| 6,226,751 | B1 | * | 5/2001 | Arrow et al. ................ 713/201 |
| 6,330,562 | B1 | * | 12/2001 | Boden et al. ................. 707/10 |
| 6,339,595 | B1 | * | 1/2002 | Rekhter et al. ............. 370/392 |

\* cited by examiner

*Primary Examiner*—Glenton B. Burgess
*Assistant Examiner*—Tod Kupstas
(74) *Attorney, Agent, or Firm*—Duke W. Yee; Thomas E. Tyson; Stephen J. Walder, Jr.

(57) ABSTRACT

A method and system for an algorithm-based network snoop avoider is provided. A first data processing system and a second data processing system communicate on a physical network by transmitting data packets on the network using a virtual private network (VPN). Data packets are transmitted through a first VPN tunnel between the first data processing system with a first network address terminating a first end of the VPN tunnel and the second data processing system with a second network address terminating a second end of the first VPN tunnel. The VPN is automatically reconfigured to use alternate addresses on the network for the tunnel endpoints by automatically determining, in accordance with a predetermined algorithm, a third network address and a fourth network address and by automatically assigning the third network address to the first data processing system and the fourth network address to the second data processing system. Data packets may then be transmitted through a second VPN tunnel in which a first end of the second VPN tunnel is terminated by the first data processing system using the third network address and a second end of the second VPN tunnel is terminated by the second data processing system using the fourth network address. The data packets may be transmitted using Internet Protocol (IP), and a portion of the network may include the Internet.

27 Claims, 6 Drawing Sheets

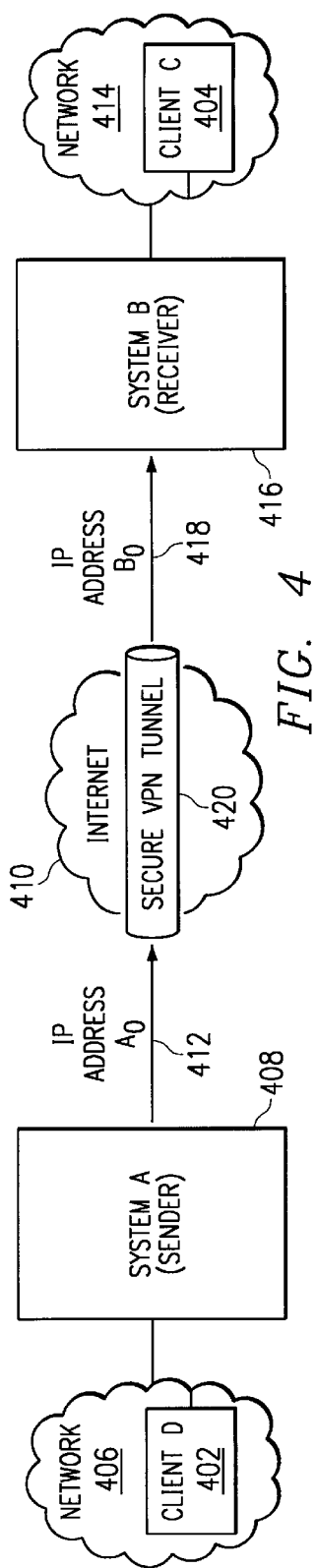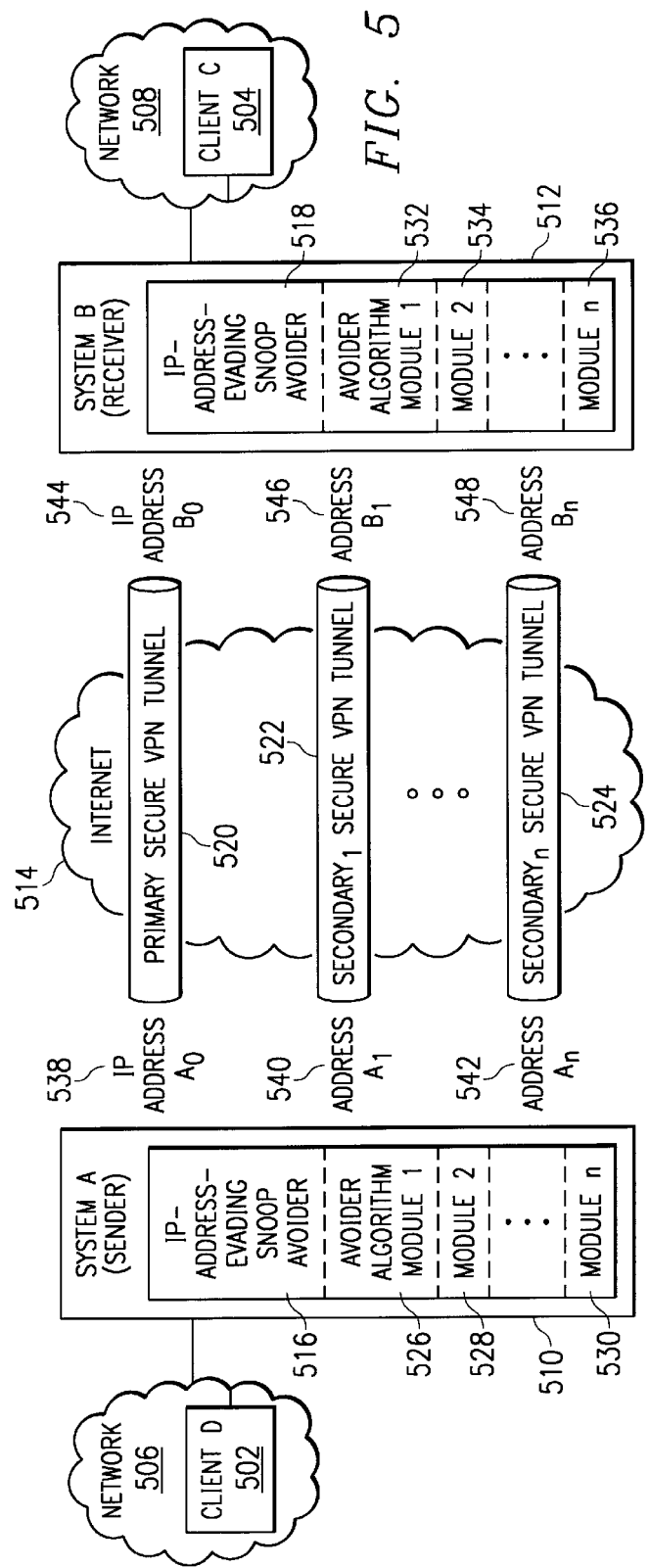

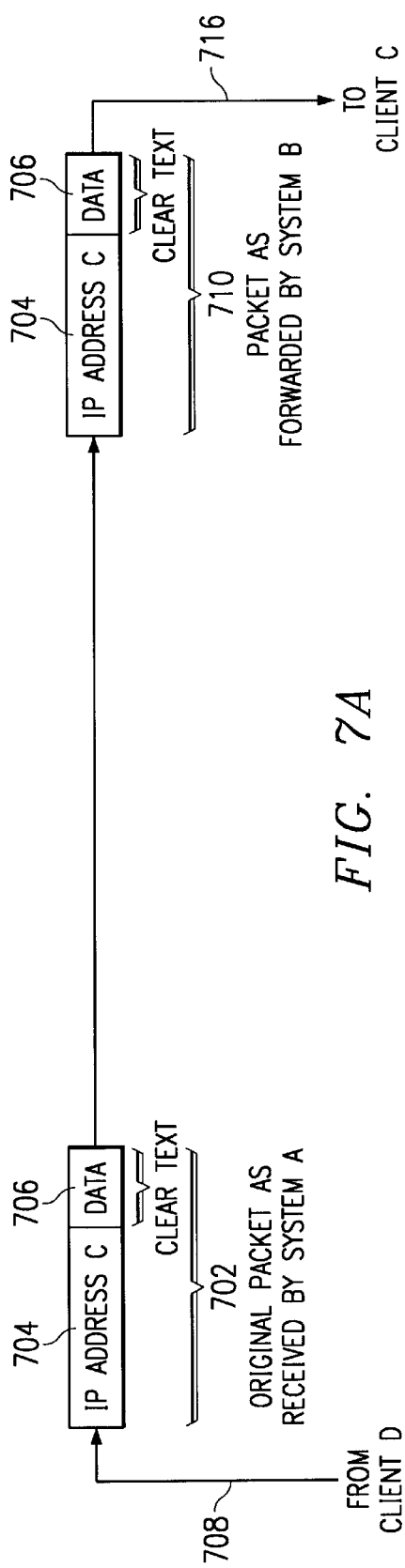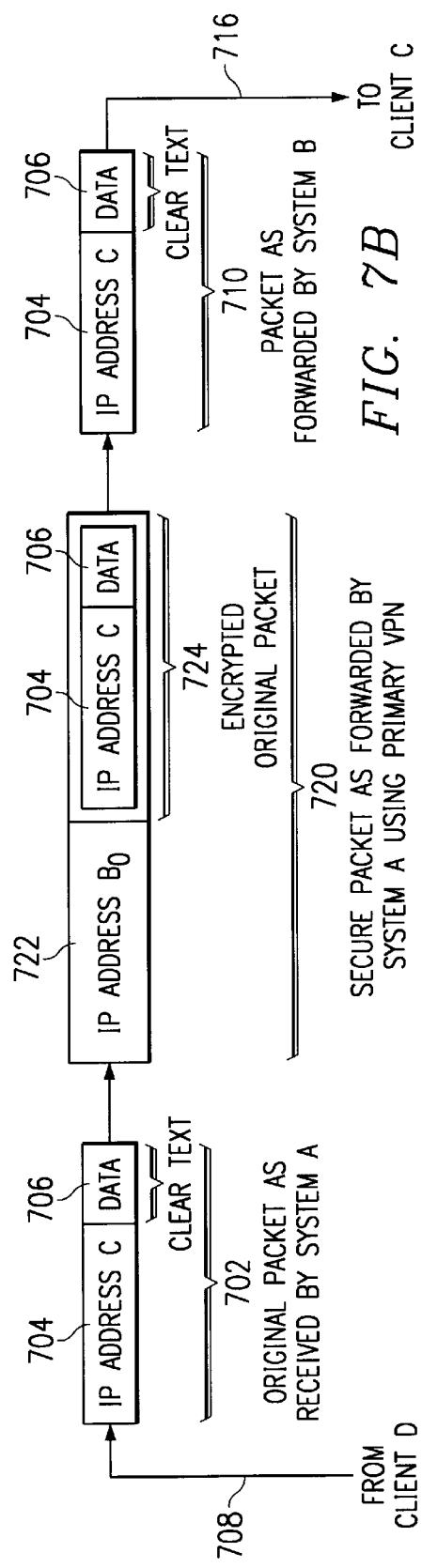

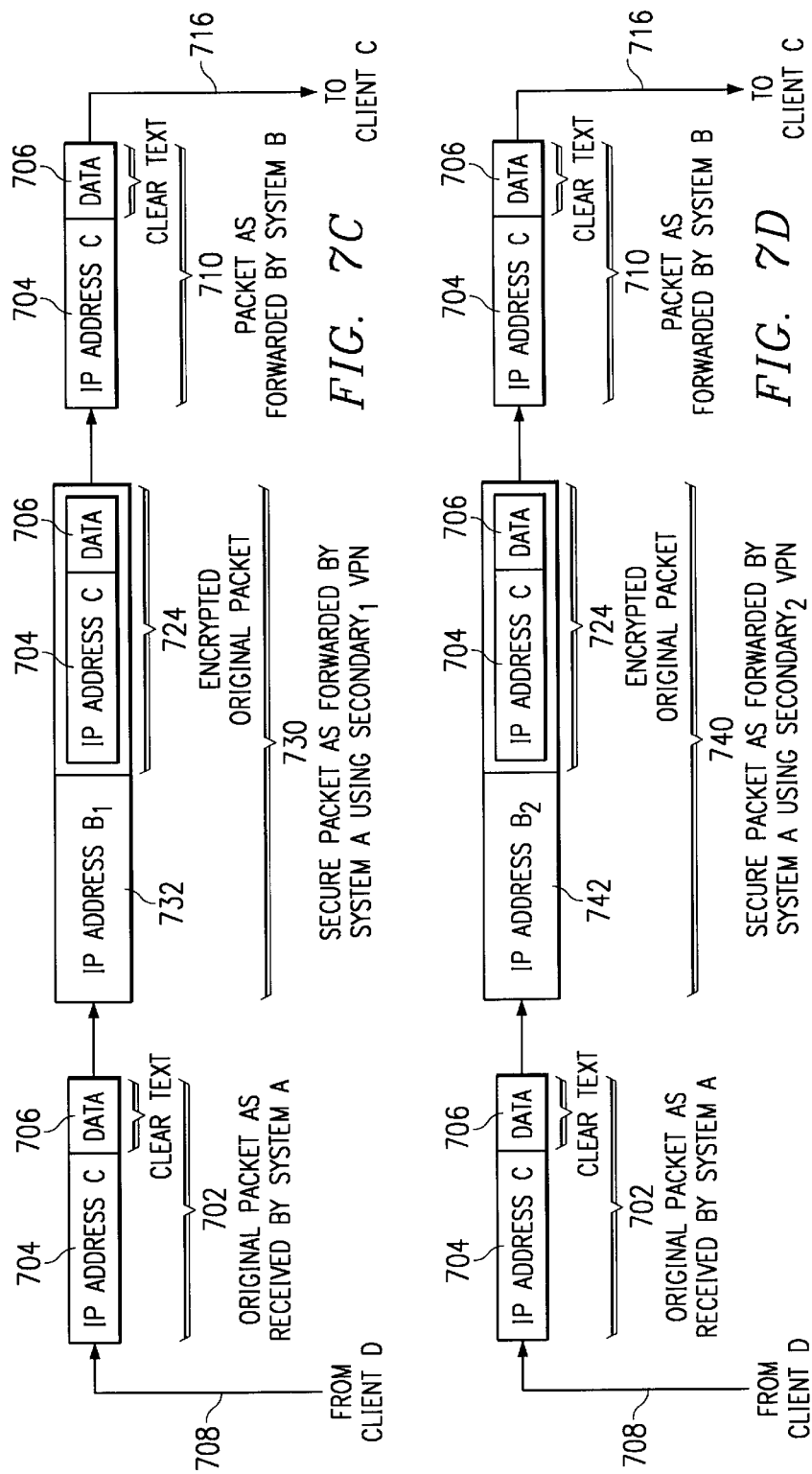

METHOD AND SYSTEM FOR ALGORITHM-BASED ADDRESS-EVADING NETWORK SNOOP AVOIDER

CROSS-REFERENCE TO RELATED APPLICATIONS

The present invention is related to the following applications entitled "METHOD AND SYSTEM FOR VIRTUAL PRIVATE NETWORK ADMINISTRATION CHANNELS", U.S. application Ser. No. 09/389,443, U.S. Pat. No. 6,614,800; "SYSTEM AND METHOD TO ENHANCE THE VPN SECURITY BY AUTOMATIC MODIFYING THE CONFIGURATION TO THE PRE-ARRANGED SECONDARY CONFIGURATION UPON DETECTION OF SNOOPING OR SECURITY BREACHES", U.S. application Ser. No. 09/428,400, U.S. Pat. No. 6,673,863; and "MANUAL VIRTUAL PRIVATE NETWORK INTERNET SNOOP AVOIDER", U.S. application Ser. No. 09/428,401, pending.

BACKGROUND OF THE INVENTION

1. Technical Field

The present invention relates to an improved data processing system and, in particular, to a method and system for secure communication on a computer network.

2. Description of Related Art

As electronic commerce becomes more prevalent, business relationships between vendors and between a vendor and its customers become more valuable. Businesses are more willing to protect those relationships by spending more money on information technology that protects the integrity of their electronic commerce connections. In so doing, businesses protect not only their data and cash flow but also intangibles, such as reputations and good will. In addition, the complexity of information technology, the pressure of global competition, and the demands of universal access around-the-clock availability of electronic systems greatly increases the need to minimize disruptions in electronic commerce operations. The growing complexity of distributed data processing systems faces increasing reliability demands. Corporations are using new methods of communicating to meet expanding and disparate needs. Traveling employees require access to company databases. Some companies employ extranets, and other companies may require constant communication paths with strategic partners. All of these factors contribute to a corporation's growing reliance and vulnerability to complex communication infrastructures.

A corporation's information technology infrastructure may fail at various pressure points, such as telecommunication links, servers, networks, etc. Although hardware reliability may be a major concern, cost may also be a concern, and corporations have attempted to contain costs by using the open, distributed infrastructure of the Internet to transmit data between corporate sites. Dedicated leased lines may be prohibitively expensive for some companies, and other companies may require more flexibility than is provided by owning a complete communication channel. However, this openness also introduces another major concern to corporations: vulnerability. Corporations must protect against both physical vulnerability, such as hardware failures, and logical vulnerability, such as electronic espionage.

Virtual private networks (VPNS) using the Internet have the potential to solve many of these enterprise-wide, communication-related problems. VPNs allow corporate administrators to connect remote branch offices to a main corporate network economically and relatively securely. Rather than depend on dedicated leased lines, an Internet-based VPN uses the open infrastructure of the Internet. Because the Internet is a public network with open transmission of data, Internet-based VPNs include measures for encrypting data passed between network sites or other measures that may be taken to protect data against eavesdropping and tampering by unauthorized parties.

VPNs are not completely secure. A security risk is associated with VPNs that use any security encryption algorithm. VPN tunnel data is encrypted before transmission on the Internet, and only the tunnel endpoints know the encryption/decryption secret key for the transmitted data. Over time, a snoop may collect encrypted data captured from a VPN tunnel. Given enough time and computational resources, a snoop may crack the encryption code and discover the secret keys used by the tunnel endpoints. At that point, a snoop would have both access to openly transmitted data and the ability to decrypt the valuable information within the captured data.

If a VPN tunnel is established for the transfer of secure data, and the integrity of the tunnel becomes suspect, the only recourse is to shut down the virtual private network. A new VPN tunnel must then be reestablished by changing one or more of the following items: encryption algorithm, Internet Protocol (IP) addresses, and secret keys. Generally, this reconfiguration is a manual process that must be agreed upon and acted upon by network or system administrators.

Therefore, it would be advantageous to provide a method and system for more secure network communication, and in particular, to provide secure communication over an open network infrastructure using a more secure form of VPN tunnels.

SUMMARY OF THE INVENTION

A method and system for an algorithm-based network snoop avoider is provided. A first data processing system and a second data processing system communicate on a physical network by transmitting data packets on the network using a virtual private network (VPN). Data packets are transmitted through a first VPN tunnel between the first data processing system with a first network address terminating a first end of the VPN tunnel and the second data processing system with a second network address terminating a second end of the first VPN tunnel. The VPN is automatically reconfigured to use alternate addresses on the network for the tunnel endpoints by automatically determining, in accordance with a predetermined algorithm, a third network address and a fourth network address and by automatically assigning the third network address to the first data processing system and the fourth network address to the second data processing system. Data packets may then be transmitted through a second VPN tunnel in which a first end of the second VPN tunnel is terminated by the first data processing system using the third network address and a second end of the second VPN tunnel is terminated by the second data processing system using the fourth network address. The data packets may be transmitted using Internet Protocol (IP), and a portion of the network may include the Internet.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a diagram depicting a network with a standard implementation of a virtual private network;

FIG. 5 is diagram depicting a network that contains the present invention for snoop avoidance on the network;

FIGS. 7A–7D are diagrams showing the transmission flows and contents of data packets on various VPNs, including a VPN implemented according to the present invention; and FIG. 8 is an example of a snoop avoider algorithm.

DETAILED DESCRIPTION OF THE PREFERRED EMBODIMENT

Figure 1:
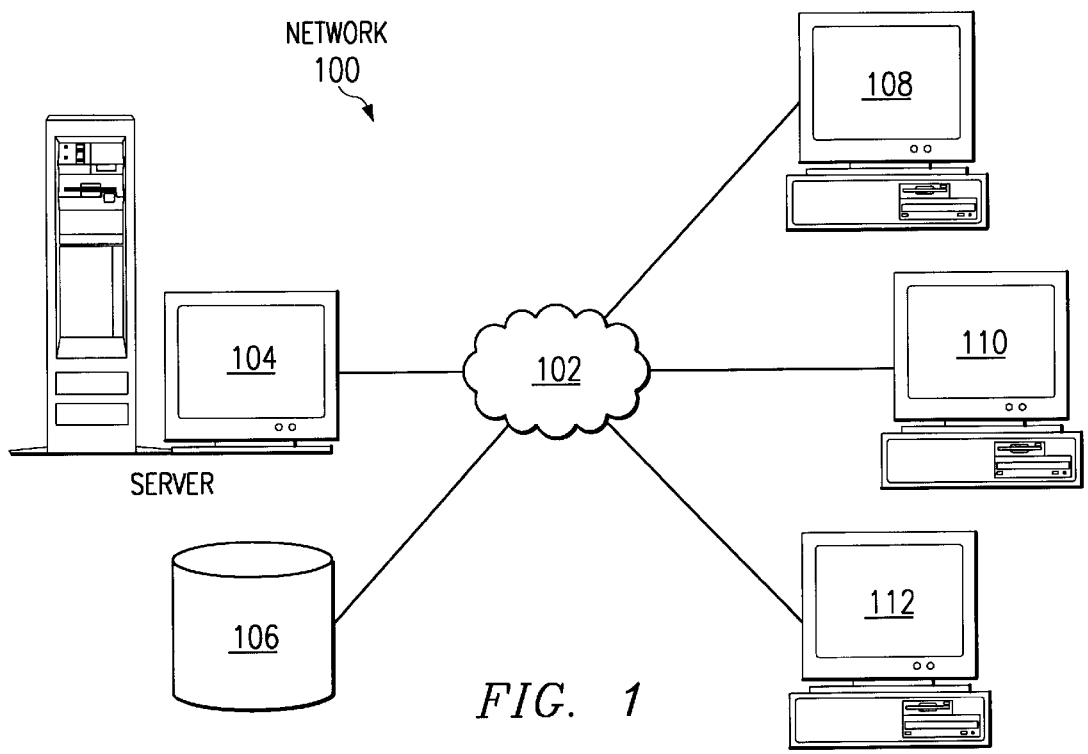
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
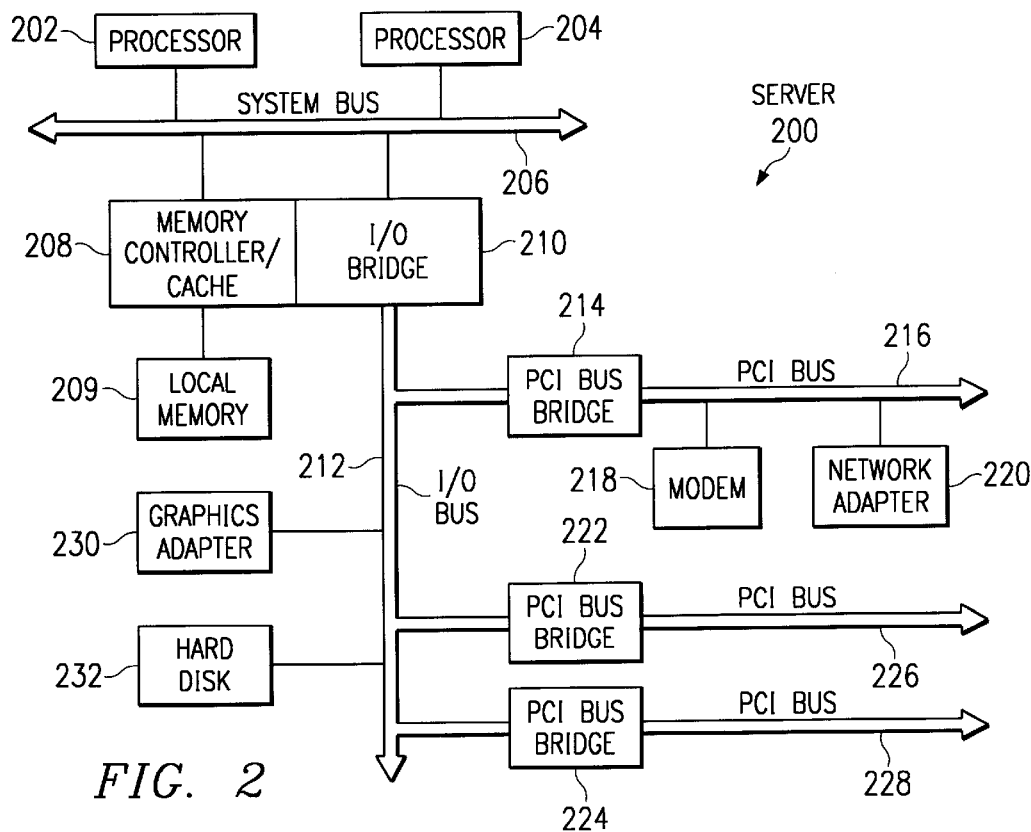
FIG. 2 is a block diagram of a data processing system which may be implemented as a server.

With reference now to FIG. 2, a block diagram of a data processing system which may be implemented as a server, such as server 104 in FIG. 1, is depicted in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted. Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards. Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention. The data processing system depicted in FIG. 2 may be, for example, an IBM RISC/System 6000, a product of International Business Machines Corporation in Armonk, N.Y., running the Advanced Interactive Executive (AIX) operating system.

Figure 3:
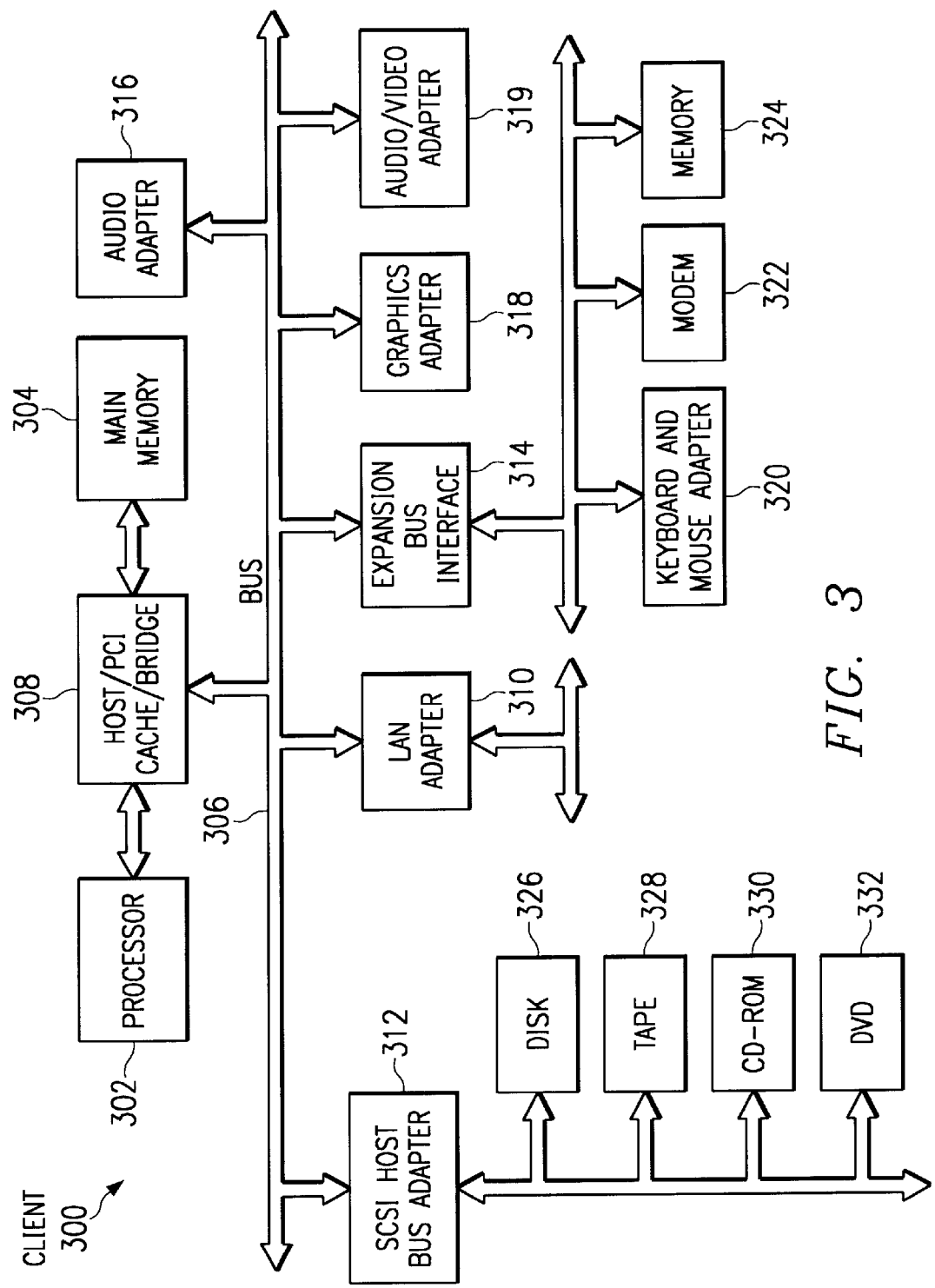
FIG. 3 is a block diagram of a data processing system in which the present invention may be implemented.

With reference now to FIG. 3, a block diagram of a data processing system in which the present invention may be implemented is illustrated. Data processing system 300 is an example of a client computer. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 may also include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. In the depicted example, SCSI host bus adapter 312 provides a connection for hard disk drive 326, tape drive 328, CD-ROM drive 330, and digital video disc read only memory drive (DVD-ROM) 332. Typical PCI local bus implementations will support three or four PCI expansion slots or add-in connectors. An operating system runs on processor 302 and is used to coordinate and provide control of various components within data processing system 300 in FIG. 3. The operating system may be a commercially available operating system, such as OS/2, which is available from International Business Machines Corporation. "OS/2" is a trademark of International Business Machines Corporation. An object oriented programming system, such as Java, may run in conjunction with the operating system, providing calls to the operating system from Java programs or applications executing on data processing system 300. Instructions for the operating system, the object-oriented operating system, and applications or programs are located on a storage device, such as hard disk drive 326, and may be loaded into main memory 304 for execution by processor 302.

Those of ordinary skill in the art will appreciate that the hardware in FIG. 3 may vary depending on the implementation. For example, other peripheral devices, such as optical disk drives and the like, may be used in addition to or in place of the hardware depicted in FIG. 3. The depicted example is not meant to imply architectural limitations with respect to the present invention. For example, the processes of the present invention may be applied to multiprocessor data processing systems.

As noted previously, a virtual private network (VPN) on an open network like the Internet is inherently open to eavesdropping by a snoop. Although the data transmitted through a VPN tunnel may be encrypted, a snoop may be able to crack the encryption code and decrypt the message traffic given enough time and computational resources. For example, while the snoop attempts to decipher the message traffic, the snoop may continue to capture all data packets addressed to a network site of interest. Because an IP address is openly placed in the header of an IP packet, the snoop may use the IP address as a convenient key for filtering the packet traffic and then storing all of the data addressed to selected IP addresses. If the snoop is vigilant, then all of the data sent to a particular IP address may be copied over time.

The present invention provides an algorithm-based IP-address-evading Internet snoop avoider. By automatically changing the IP addresses of the trusted hosts on the VPN via a predefined algorithm, the present invention disables the snoop's ability to capture all of the data traffic addressed to a site of interest. By preventing the snoop from obtaining the electronic communications of interest, the snoop is denied the material upon which it may attempt to use decryption. Although the following examples discuss the Internet and data packets which use IP addressing, the present invention is applicable to other networks and other network protocols.

With reference now to FIG. 4, a diagram depicts a network with a standard implementation of a virtual private network. The network depicted in FIG. 1 is similar to the network depicted in FIG. 4 except that FIG. 4 shows the use of a VPN tunnel. Client 402 desires to send data to client 404. Client 402 sits within network or subnetwork 406 connected to system A 408. System A 408 resides on Internet 410 at IP address $A_O$ 412. Client 404 sits on network 414 which is connected to system B 416, which sits on Internet 410 at IP address $B_0$ 418. Secure VPN tunnel 420 connect system A 408 and system B 416.

The Internet provides the fundamental plumbing for a VPN. Security gateways sit between public and private networks, preventing unauthorized intrusions into the private network. Security gateways may provide tunneling capabilities and encrypt private data before it is transmitted on the public network. In general, a security gateway for a VPN fits into one of the following general categories: routers, firewalls, integrated VPN hardware, and VPN software. System A 408 and system B 416 may be any of these types of security gateways. These systems provide endpoints for the VPN tunnel in the present example. Client 402 may send secure communication to client 404 via secure VPN tunnel 420.

A virtual private network is a network on which all users appear to be on the same LAN segment even though there may be many networks in between the users, including public networks such as the Internet. To achieve this functionality, a secure virtual private network accomplishes three tasks. First, they must be able to tunnel IP packets through the public network such that two remote LAN segments do not "appear" to be separated by the public network. Second, the solution must add encryption such that traffic crossing the public network can not be sniffed, intercepted, read, or modified. Finally, the VPN must be able to positively authenticate the transmitting end or receiving end of the communication link so that someone or some machine can not wrongfully impersonate, or spoof, one end of the communications link to gain access to protected corporate resources.

In a virtual private network, "virtual" implies that the network is dynamic with connections configured according to organizational needs. The network is formed logically, regardless of the physical structure of the underlying network, such as the Internet. Unlike the leased lines used in traditional corporate networks, VPNs do not maintain permanent links between the endpoints that make up the corporate network. Instead, when a connection between two sites is required, the VPN is created. When the connection is no longer needed, it is torn down, making the bandwidth and other network resources available for other uses.

Tunnels can consist of two types of endpoints: an individual computer or a LAN with a security gateway.

A secure virtual private network is created in the following way. First, IP packets destined to a protected location are encapsulated in a new packet containing only the IP addresses of the source and destination encryptor. This allows clients to connect unrouted IP networks to routed IP networks, effectively tunneling packets through the public network. Encryption is achieved by using an appropriate encryption algorithm to encrypt packets destined to a remote client. The entire packet may be encrypted, including the original header, before encapsulating this information in a new packet. In addition to protecting the data being transmitted, this completely hides the internal topology of the two remote networks and also protects other valuable header information, such as the type of traffic (i.e., mail, FTP traffic, HTTP traffic, etc.) from a snoop. Digital certificates may also be used to positively authenticate either end of the communication link before data is transferred.

With reference now to FIG. 5, a diagram depicts a network that contains the present invention for snoop avoidance on the network. Client 502 desires to send data to client 504. Client 502 operates within network 506, and client 504 operates within network 508. System A 510 and system B 512 act as security gateways between network 506 and Internet 514 or network 508 and Internet 514, respectively. VPN tunnels 520–524 are controlled by gateways 510 and 512. These gateways may contain several different types of applications including a standard VPN controller.

However, in accordance with the present invention, gateways 510 and 512 contain IP-address-evading snoop avoiders 516 and 518. Snoop avoiders 516 and 518 contain avoider algorithm modules 526–536 that provide input concerning the time and manner to be used to switch between VPN tunnels 520–524.

In the present system, VPNs are defined with a set of known IP addresses at VPN configuration time. IP addresses 538–542 serve as source addresses for VPN tunnels 520–524, and IP addresses 544–548 serve as target addresses of VPN tunnels 520–524. Snoop avoiders 516 and 518 use the algorithms provided by avoider algorithm modules to decide when and how to switch between VPN tunnels in an attempt to avoid a snoop.

Different protocols may be used with these VPN tunnels, such as point-to-point tunneling protocol (PPTP), layer 2 forwarding (L2F), layer 2 tunneling protocol (L2TP) and IP security protocol (IPSec).

IPSec allows the sender, or a security gateway acting on the sender's behalf, to authenticate or encrypt each IP packet or to apply both operations to the packet. Separating the application of packet authentication and encryption has led to two different methods of using IPSec, called modes. In transport mode, only the transport-layer segment of an IP packet is authenticated or encrypted. The other approach, authenticating or encrypting the entire IP packet, is called tunnel mode. While transport-mode IPSec can prove useful in many situations, tunnel-mode IPSec provides even more protection against certain attacks and traffic monitoring that may occur on the Internet. In a preferred embodiment, the IPSec tunnel mode may be used as the protocol for the VPN tunnels shown in FIG. 5.

Figure 6:
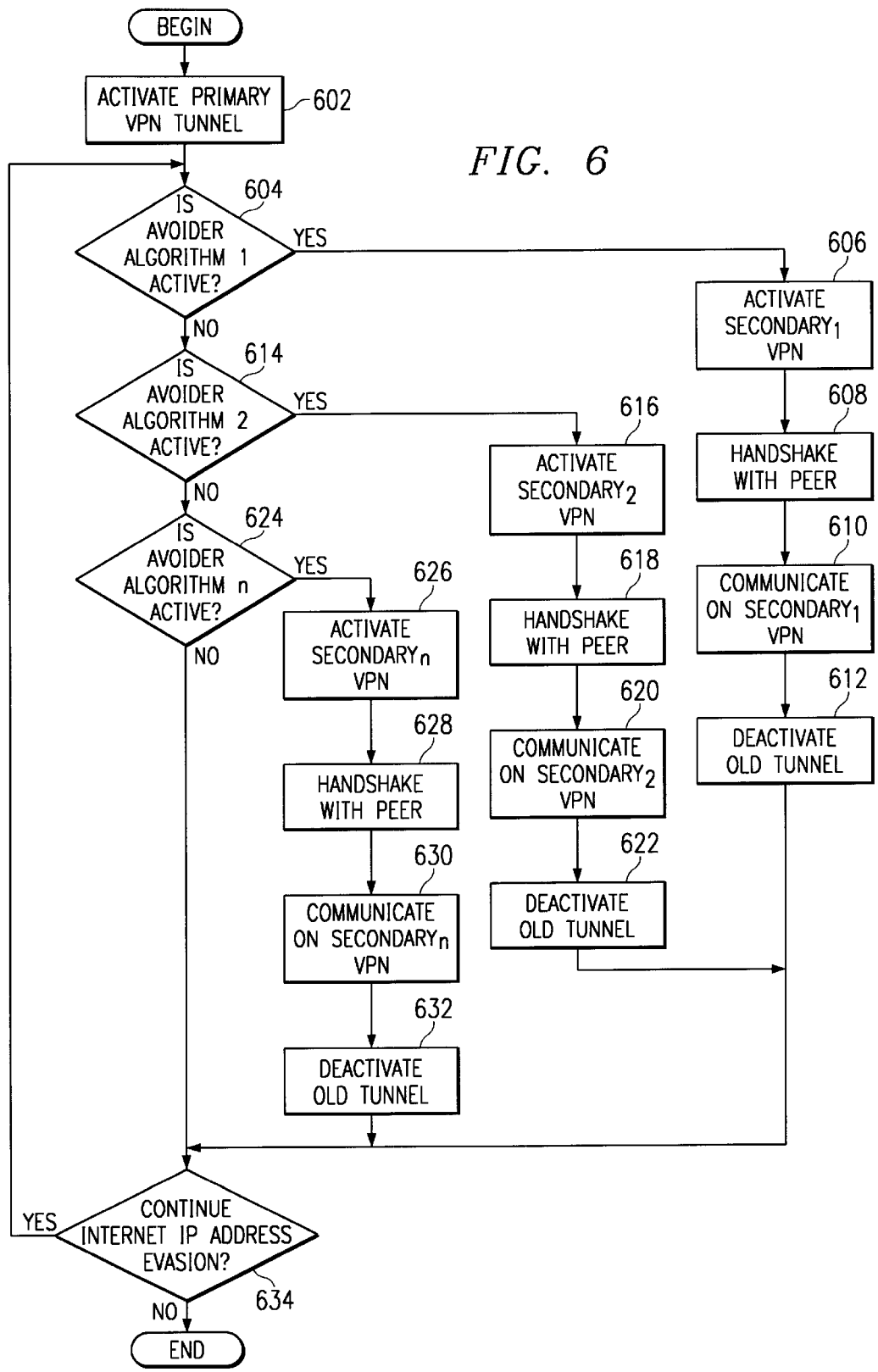
FIG. 6 is a flowchart depicting a process for choosing an algorithm to be used in the snoop avoider module.

With reference now to FIG. 6, a flowchart depicts a process for choosing an algorithm to be used in the snoop-avoider module. The process begins with the activation of a VPN tunnel (step 602). A determination is then made as to whether snoop avoider algorithm 1 is active (step 604). If so, then the secondary$_1$ VPN tunnel is activated (step 606). After handshaking with its peer (step 608), communication may be made on the secondary$_1$ VPN tunnel (step 610). Once communication is complete, the tunnel is deactivated, and the process branches to await further activations.

If snoop avoider algorithm 1 is not active, then a determination is made as to whether snoop avoider algorithm 2 is active (step 614). If so, the secondary$_2$ VPN tunnel is activated (step 616). After handshaking with its peer (step 618), the clients or gateways may communicate on the secondary$_2$ VPN tunnel (step 620). After communication is complete, the tunnel is deactivated (step 622), and the process branches for determination of other activations. deactivated (step 632), and the process branches to determine whether other activations are necessary.

After one of the snoop avoider algorithms is used, or after a determination that none of the snoop avoider algorithms are active, a determination is made as to whether the snoop avoider module should continue Internet IP address evasion (step 634). If so, the process branches to repeat the determination process for snoop avoider algorithms. If not, then the process is complete.

With reference now to FIGS. 7A–7D, the transmission flows of data packets on various VPNs and the data packet contents are depicted. Although FIGS. 7A–7D show the transmission of a packet in one direction, it should be understood that the processing of the data packets is mirrored for data packets transmitted in the opposite direction.

FIG. 7A shows a typical data packet and the transmission flow of the packet on a standard network, such as the network shown in FIG. 4, albeit without the VPN functionality. Original packet 702 contains destination IP address 704 and content data 706 which is received by system A from client D via network path 708. In this example, the original data packet is addressed to destination client C, and system A, which may be a gateway, forwards or routes the packet to system B, which may be another gateway. Packet 710 is a copy of the original packet within system B, and packet 710 contains destination IP address 704 and content data 706 in a manner similar to the original packet. System B then forwards packet 710 to client C via network path 716 In this example, the original data packet is addressed to destination client C, and system A, which may be a gateway, forwards or routes the packet to system B, which may be another gateway. Packet 710 is a copy of the original packet within system B, and packet 710 contains destination IP address 704 and content data 706 in a manner similar to the original packet. System B then forwards packet 710 to client C via network path 716 using the network address for client C from packet 710.

As would be apparent to one of ordinary skill in the art, system A does not forward a packet to client C that is identical to the packet that system A receives. In the IP protocol, routing occurs in the following manner. After acquiring a router's address by some means, which in this example may be system B, the source host, i.e. system A, sends a packet address specifically to a router's physical (Media Access Control Layer or MAC Layer) address but with a protocol (network layer) address of the destination host. Upon examining the destination protocol address of the packet, the router determines that it either knows or does not know how to forward the packet to the next-hop. If the router does not know how to forward the packet, it typically drops the packet. If the router knows how to forward the packet, it changes the destination physical address currently in the packet to the destination physical address of the next-hop and transmits the packet. The next-hop may or may not be the ultimate destination host. If not, the next-hop is usually another router that executes the same switching decision process. As the packet moves through the internetwork, its physical address changes but its protocol address remains constant. Other fields may also be modified by a router or gateway. Hence, several fields within the data packet may change along the transmission path of the data packet. However, for the purposes of the explanation of the present invention, the packet is essentially unchanged.

FIG. 7B shows a typical data packet and the transmission flow of the packet on a standard network implementing a VPN, such as the network shown in FIG. 4. Original packet 702 contains destination IP address 704 and content data 706 which is received by system A from client D in a manner similar to FIG. 7A.

In this example, however, system A generates encrypted packet 724 from the original packet and places encrypted packet 724 within secure packet 720 containing VPN tunnel endpoint address 722. Packet 710 is a copy of the original packet within system B after decrypting packet 720 received from system A, and packet 710 contains destination IP address 704 and content data 706 in a manner similar to the original packet. System B then forwards packet 710 to client C via network path 716 using the network address for client C from packet 710.

FIG. 7C shows the transmission flow of a data packet on a network implementing the snoop avoider of the present invention, such as the network shown in FIG. 5. Original packet 702 contains destination IP address 704 and content data 706 which is received by system A from client D in a manner similar to FIG. 7B.

In this example, however, secure packet 730 contains snoop-avoiding, VPN tunnel endpoint address 732. This address has been selected according to a snoop avoiding algorithm in a snoop avoider module in system A and system B. System A and system B have a set of multiple possible addresses from which VPN tunnel endpoint addresses may be chosen.

Secure packet 730 is then routed to system B. Packet 710 is a copy of the original packet within system B after decrypting packet 730 that was received from system A at VPN tunnel endpoint address 732 assigned to system B. Packet 710 contains destination IP address 704 and content data 706 in a manner similar to the original packet. System B then forwards packet 710 to client C via network path 716 using the network address for client C from packet 710.

FIG. 7D shows another transmission flow of a data packet on a network implementing the snoop avoider of the present invention, such as the network shown in FIG. 5. Original packet 702 contains destination IP address 704 and content data 706 which is received by system A from client D in a manner similar to FIGS. 7B–7C.

In this example, however, secure packet 740 contains snoop-avoiding, VPN tunnel endpoint address 742. This address has also been selected according to a snoop avoiding algorithm in snoop avoider modules in system A and system B in a manner similar to FIG. 7C. Address 742 may be selected subsequent to address 732 according to an algorithm that determines when a previous VPN tunnel should be deactivated and when a new VPN tunnel should be activated. System A and system B may use a VPN tunnel with tunnel endpoint address 732 until a determinable event occurs. At that point, in accordance with the present invention, the systems switch to a different VPN tunnel with tunnel endpoint address 742. Various algorithms may be used to determine the event that causes the snoop-avoiding tunnel switch.

Secure packet 740 is then routed to system B. Packet 710 is a copy of the original packet within system B after decrypting packet 740 that was received from system A at VPN tunnel endpoint address 742 assigned to system B. Packet 710 contains destination IP address 704 and content data 706 in a manner similar to the original packet. System B then forwards packet 710 to client C via network path 716 using the network address for client C from packet 710.

With reference now to FIG. 8, an example of a snoop avoider algorithm is provided. In this example, snoop avoidance is achieved using an algorithm based upon the current tunnel endpoint addresses and the amount of data traffic over the lifetime of the VPN tunnel.

A VPN tunnel has tunnel endpoint addresses 802 and 804. The sum of the third octets of the VPN endpoint IP addresses, which in this case equals ten, is multiplied by a constant, which in this case equals 1k or 1024. The result then places a threshold, shown as maximum quantity 806, on the number of data packets that may traverse the current incarnation of the VPN tunnel with these tunnel endpoint addresses. Each of the endpoint gateways counts the number of data packets that have traversed the VPN tunnel, and when the threshold is reached, the gateways deactivate the current VPN tunnel and activate a new VPN tunnel through which subsequent traffic is routed.

As another example of a snoop avoidance algorithm, the systems at the VPN tunnel endpoints may be temporally synchronized so that a VPN tunnel is activated for a specific time period. When a tunnel is activated, each endpoint calculates a lifetime value for the tunnel according to a predetermined function. For example, the lifetime of the tunnel could depend upon the time at which the tunnel was activated, wherein a random lifetime for the tunnel is computed as a function of the sum of the number of minutes past the current hour plus some constant, the resulting sum modulo some constant.

The advantages of the present invention should be apparent in view of the detailed description provided above. When a snoop desires a copy of the data belonging to a particular person, institution, or corporation, the snoop may attempt to obtain the data by copying the data when presented on a network as data traffic to and from the entity of interest. If the network is an open network on which the snoop may access data traffic without physical detection, such as the Internet, the snoop merely targets the entity's network sites using publicly available network addresses. The snoop may use a network address as a key for selecting which portions of the network traffic are important.

However, as the addresses of the sites of interest constantly change, the challenge presented to the snoop is similar to a marksman attempting to target a moving object. The snoop must collect much more data traffic in order to attempt to collect all of the data traffic of interest. In addition, the snoop must then attempt to determine which portions of all of the captured data traffic are of actual importance, which may be an insurmountable task. Since all of the data traffic of importance is encrypted, the data traffic will not have any distinguishing characteristics with which the snoop may sort the data traffic.

With the present invention, the liability of the open network, i.e. open access to data traffic using open standards, may be converted into an advantage by using the network infrastructure against a potential snoop. By automatically changing the addresses of the VPN tunnel endpoints via a predefined algorithm, the present invention disables or cripples a snoop's ability to capture data traffic of interest. By preventing the snoop from obtaining the electronic communications of interest, the snoop is denied the material upon which it may attempt to use decryption. The snoop would then be forced to compensate against the snoop-avoiding VPN by physically intruding on the network at some point beyond the VPN tunnel endpoints, thereby making the snoop vulnerable to detection and significantly increasing the snoop's costs and difficulties.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed:

1. A method for communicating on a wide area network between a first data processing system and a second data processing system, the method comprising the computer-implemented steps of:

establishing a virtual private network (VPN) tunnel using a first network address for the first data processing system and a second network address for the second data processing system, wherein the first network address and the second network address are addresses used to route data over the wide area network;

transmitting data packets on the wide area network from the first data processing system to the second data processing system using the VPN tunnel; and automatically selecting, during a same session between the first data processing system and the second data processing system, an alternate VPN tunnel for transmitting data packets on the wide area network from the first data processing system to the second data processing system by selecting alternate network addresses for the first data processing system and the second data processing system, wherein the alternate network addresses are addresses used to route data over the wide area network, and wherein the alternate network addresses are different from the first network address and the second network address.

2. The method of claim 1 wherein the step of automatically selecting an alternate VPN tunnel further comprises:

automatically determining, in accordance with a predetermined algorithm, a third network address for the first data processing system and a fourth network address for the second data processing system, wherein the third network address and the fourth network address are addressed used to route data over the wide area network; and automatically assigning the third network address to the first data processing system and the fourth network address to the second data processing system.

3. The method of claim 1 wherein the predetermined algorithm is a function which maps a network address to another network address.

4. The method of claim 3 wherein the first network address and the third network address are members of a first predetermined set of network addresses.

5. The method of claim 2 further comprising:

transmitting data packets through the alternate VPN tunnel between the first data processing system and the second data processing system, wherein a first end of the alternate VPN tunnel is terminated by the first data processing system using the third network address and a second end of the alternate VPN tunnel is terminated by the second data processing system using the fourth network address.

6. The method of claim 1 wherein the data packets are transmitted using Internet Protocol (IP).

7. The method of claim 1 wherein the wide area network comprises the Internet.

8. The method of claim 1 wherein the first data processing system is a secure gateway for connecting the wide area network to another network.

9. The method of claim 1, wherein automatically reconfiguring the VPN to use alternate addresses on the network for the first data processing system and the second data processing system includes:

determining which of a plurality of reconfiguring algorithms is currently active; and assigning an alternate address to the first data processing system and the second data processing system based on which of the plurality of reconfiguring algorithms is currently active.

10. The method of claim 1, further comprising:

activating one of a plurality of reconfiguring algorithms based on information from one or more avoider algorithm modules indicating when to switch between VPN tunnels.

11. The method of claim 10, wherein the information from one or more avoider algorithm modules indicating when to switch between VPN tunnels includes information indicating that VPN tunnels should be switched based on a maximum number of data packets that may be sent over a currently active VPN tunnel.

12. The method of claim 10, wherein the information from one or more avoider algorithm modules indicating when to switch between VPN tunnels includes information indicating a specified time period a current VPN tunnel may be active.

13. A distributed data processing system for communicating on a wide area network, the distributed data processing system comprising:

establishing means for establishing a virtual private network (VPN) tunnel using a first network address for a first data processing system and a second network address for a second data processing system, wherein the first network address and the second network address are addresses used to route data over the wide area network;

transmitting means for transmitting data packets on the wide area network from the first data processing system to the second data processing system using the VPN tunnel; and reconfiguring means for automatically selecting, during a same session between the first data processing system and the second data processing system, an alternate VPN tunnel for transmitting data packets on the wide area network from the first data processing system to the second data processing system by selecting alternate network addresses for the first data processing system and the second data processing system, wherein the alternate network addresses are addresses used to route data over the wide area network, and wherein the alternate network addresses are different from the first network address and the second network address.

14. The distributed data processing system of claim 13 wherein the reconfiguring means further comprises:

determining means for automatically determining, in accordance with a predetermined algorithm, a third network address for the first data processing system and a fourth network address for the second data processing system, wherein the third network address and the fourth network address are addressed used to route data over the wide area network; and assigning means for automatically assigning the third network address to the first data processing system and the fourth network address to the second data processing system.

15. The distributed data processing system of claim 14 wherein the predetermined algorithm is a function which maps a network address to another network address.

16. The distributed data processing system of claim 15 wherein the first network address and the third network address are members of a first predetermined set of network addresses.

17. The distributed data processing system of claim 14 wherein the transmitting means further comprises:

second sending means for sending data packets through VPN tunnel between the first data processing system and the second data processing system, wherein a first end of the alternate VPN tunnel is terminated by the first data processing system using the third network address and a second end of the alternate VPN tunnel is terminated by the second data processing system using the fourth network address.

18. The distributed data processing system of claim 13 wherein the data packets are transmitted using Internet Protocol (IP).

19. The distributed data processing system of claim 13 wherein the wide area network comprises the Internet.

20. The distributed data processing system of claim 13 wherein the first data processing system is a secure gateway for connecting the wide area network to another network.

21. The distributed data processing system of claim 13, wherein the reconfiguring means includes:
   means for determining which of a plurality of reconfiguring algorithms is currently active; and
   means for assigning an alternate address to the first data processing system and the second data processing system based on which of the plurality of reconfiguring algorithms is currently active.

22. The distributed data processing system of claim 13, further comprising:
   means for activating one of a plurality of reconfiguring algorithms based on information from one or more avoider algorithm modules indicating when to switch between VPN tunnels.

23. The distributed data processing system of claim 22, wherein the information from one or more avoider algorithm modules indicating when to switch between VPN tunnels includes information indicating that VPN tunnels should be switched based on a maximum number of data packets that may be sent over a currently active VPN tunnel.

24. The distributed data processing system of claim 22, wherein the information from one or more avoider algorithm modules indicating when to switch between VPN tunnels includes information indicating a specified time period a current VPN tunnel may be active.

25. A computer program product on a computer-readable medium for use in a data processing system for communicating on a network, the computer program product comprising:
   instructions for establishing a virtual private network (VPN) tunnel using a first network address for a first data processing system and a second network address for a second data processing system, wherein the first network address and the second network address are addresses used to route data over the wide area network;
   instructions for transmitting data packets on the wide area network from the first data processing system to the second data processing system using the VPN tunnel; and
   instructions for automatically selecting, during a same session between the first data processing system and the second data processing system, an alternate VPN tunnel for transmitting data packets on the wide area network from the first data processing system to the second data processing system by selecting alternate network addresses for the first data processing system and the second data processing system, wherein the alternate network addresses are addresses used to route data over the wide area network, and wherein the alternate network addresses are different from the first network address and the second network address.

26. The computer program product of claim 25 wherein the first data processing system is a secure gateway for connecting a network to the Internet.

27. A method for communicating on a network between a first data processing system and a second data processing system, the method comprising the computer-implemented steps of:
   transmitting data packets on the network from the first data processing system to the second data processing system using a first virtual private network (VPN) tunnel, wherein the first VPN tunnel has endpoints at the first data processing system and the second data processing system and the first data processing system and second data processing system have original respective addresses; and
   automatically selecting a second VPN tunnel, during a same session between the first data processing system and the second data processing system, wherein the second VPN tunnel has endpoints at the first data processing system and the second data processing system and wherein the second VPN tunnel uses alternate addresses different from the original respective addresses for the first data processing system and the second data processing system.

* * * * *